United States Patent [19]

Gay et al.

[11] Patent Number: 4,750,601
[45] Date of Patent: Jun. 14, 1988

[54] AUTOMOTIVE CLUTCH RELEASE BEARING

[75] Inventors: Christian Gay, Paris; Philippe Lassiaz, Boulogne, both of France

[73] Assignee: Valeo, Paris, France

[21] Appl. No.: 845,182

[22] Filed: Mar. 28, 1986

[30] Foreign Application Priority Data

Apr. 1, 1985 [FR] France .................................. 85 04925
Sep. 3, 1985 [FR] France .................................. 85 13048

[51] Int. Cl.⁴ .............................................. F16D 23/14
[52] U.S. Cl. ..................................... 192/98; 192/110 B
[58] Field of Search ................... 192/98, 110 B, 99 S; 308/233, 184 A

[56] References Cited

U.S. PATENT DOCUMENTS

| | | | |
|---|---|---|---|
| 2,093,799 | 9/1937 | Bemis | 192/98 |
| 4,029,186 | 6/1977 | De Gennes | 192/98 |
| 4,093,053 | 6/1978 | Ernst et al. | 192/98 |
| 4,144,957 | 3/1979 | de Gennes | 192/98 |
| 4,271,949 | 6/1981 | Guerton et al. | 192/98 |
| 4,357,058 | 11/1982 | Sonnerat | 308/233 |
| 4,466,527 | 8/1984 | Billet | 192/110 B |
| 4,537,294 | 8/1985 | Renaud | 192/110 B |
| 4,613,028 | 9/1986 | Renaud et al. | 192/110 B |

FOREIGN PATENT DOCUMENTS

| | | |
|---|---|---|
| 0030165 | 6/1981 | European Pat. Off. . |
| 2078122 | 11/1971 | France . |
| 2195297 | 3/1974 | France . |
| 2337281 | 7/1977 | France . |
| 2346600 | 10/1977 | France . |
| 2459906 | 1/1981 | France . |
| 1441804 | 7/1976 | United Kingdom . |

Primary Examiner—David A. Scherbel
Assistant Examiner—Caroline D. Dennison
Attorney, Agent, or Firm—Charles E. Brown; Brown, Charles A.

[57] ABSTRACT

A clutch release bearing suitable for automobile vehicles comprises an operating element designed to be acted on directly or indirectly by a control member. In practice this is a clutch release yoke. It also comprises a drive member designed to operate on the clutch release device of a clutch. This bears axially on the operating element either directly or indirectly. Coupling means couple the drive element to the operating element in the axial direction. The coupling means are in one piece with a substantially plane plate and have a generally U-shaped configuration, with two parallel arms joined by an arch-shaped curve middle part. They consist of two clips disposed at diametrically opposite positions relative to each other. Each is formed from a respective arm of the aforementioned plate, the whole forming a single member.

25 Claims, 3 Drawing Sheets

U.S. Patent　　Jun. 14, 1988　　Sheet 3 of 3　　4,750,601
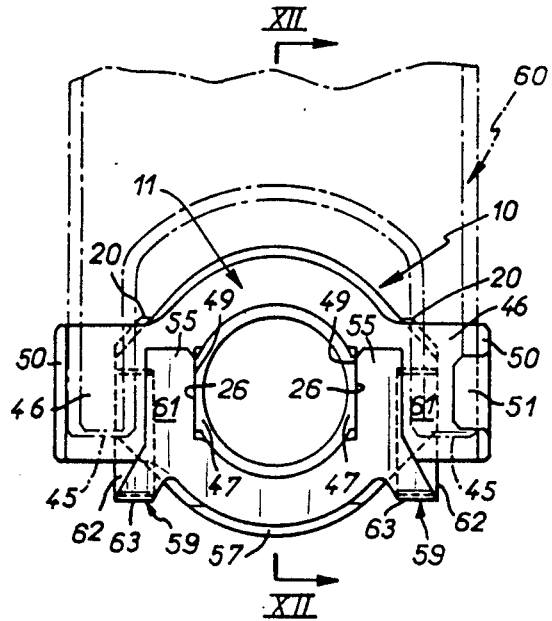
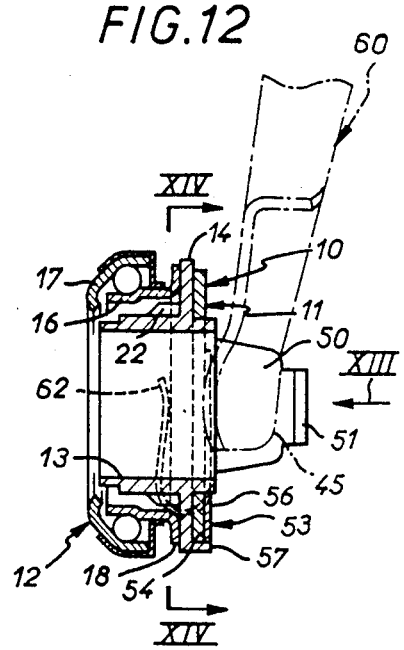
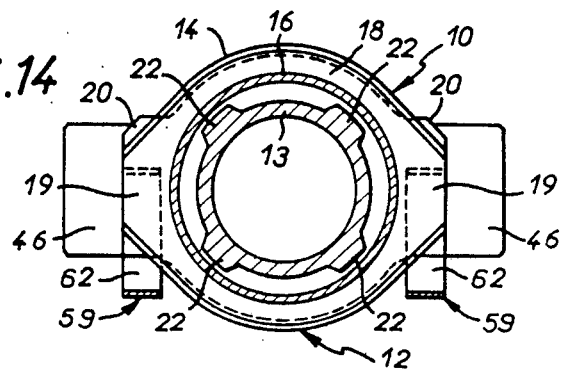
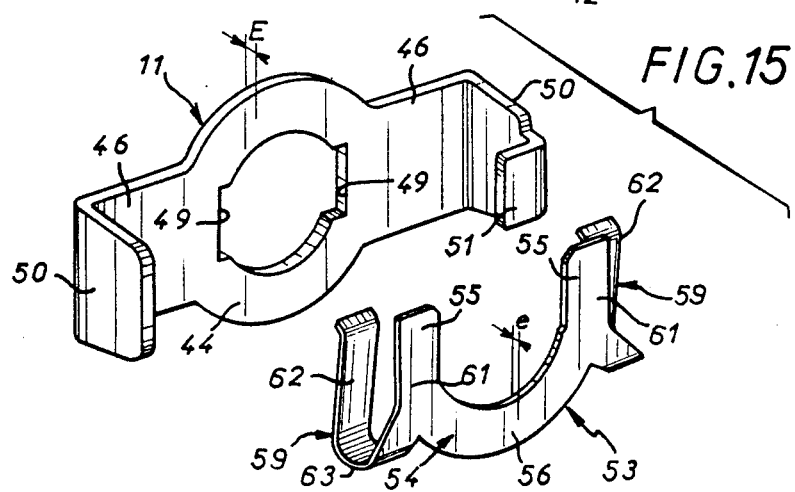

AUTOMOTIVE CLUTCH RELEASE BEARING

The present invention is generally concerned with clutch release bearings and more particularly with those for equipping automobile vehicles.

As is known, a clutch release bearing generally comprises an operating element which is adapted to be operated on directly or indirectly by a control member, in practice a clutch release yoke, a drive element adapted to operate on the clutch release device of a clutch and bearing axially on the operating element, directly or indirectly, and coupling means which couple said drive element axially to said operating element.

The present invention is more particularly directed to the implementation of these coupling means.

Specifically, the object of the present invention is a clutch release bearing, in particular for automobile vehicles, of the kind comprising an operating element adapted to be operated on directly or indirectly by a control member, in practice a clutch release yoke, a drive element adapted to operate on the clutch release device of a clutch and bearing axially on the operating element, directly or indirectly, and coupling means which couple said drive element axially to said operating element, this clutch release bearing being characterized in that said coupling means are in one piece with a substantially plane plate of overall U-shaped configuration with two arms which are generally parallel to each other joined together by a curved middle part in the shape of an arch, which constitute two clips disposed at generally diametrally opposite positions relative to each other and which each originate from a respective arm of said plate, the whole constituting a single part.

As a result assembly is greatly facilitated: the plate of which the coupling means form part may advantageously be fitted by simple radial engagement over the operating element.

When as is usually the case, and especially in the case where it is made of a synthetic material, there is associated with the operating element an anti-wear plate, usually called the bearing plate, which bears axially against it, either directly or indirectly, the plate with which, in accordance with the invention, the clips constituting the coupling means are in one piece may advantageously, if required, and in accordance with a first development of the invention, itself form a bearing plate of this kind.

A single coupling and bearing member being thus used to constitute the bearing plate and the coupling means, the clutch release bearing in accordance with the invention advantageously comprises only a minimum number of component parts, so that its fabrication and assembly are advantageously and economically simplified.

As an alternative to this, however, where it is desirable that they be made separately, the plate with which, in accordance with the invention, the clips constituting the coupling means are in one piece (the coupling plate) may be part of a coupling member separate from the bearing plate.

This is particularly the case when the fingers of the associated control member are relatively widely spaced and the arms that the bearing plate features for them to act on must themselves be of sufficient size.

In practice these arms extend radially, cantilever-fashion relative to the main part of the bearing plate.

If the corresponding overhang is relatively large relatively thick sheet metal must be used to fabricate the assembly to achieve adequate mechanical strength and in particular bending resistance for these arms.

The clips constituting the associated coupling means must conjointly and preferably be made of relatively thin sheet metal, since it is desirable for them to feature some elasticity, for assembly purposes.

In practice, when two separate plates are used, namely a coupling plate and a bearing plate, in a preferred implementation the coupling plate is directly superposed on the bearing plate.

In this case, the two arms of each clip constituting the coupling means are preferably offset relative to each other not only axially but also radially, that through which a clip of this kind connects to the coupling plate being generally further from the axis of the assembly than the other.

For a given overall diameter, the fingers of the control member are therefore given sufficient access to the arms of the bearing plate, the disengagement of the fingers being facilitated at the same time as achieving appropriate fabrication and installation of the coupling means to be employed.

Also, the elasticity of the coupling means is favored.

In the case of a self-centering release bearing of which the self-centering action is maintained, that is to say a clutch release bearing in which the drive element is not only movable in all transverse directions relative to the operating element but is also acted on by axially acting elastic means adapted to urge it towards the operating element, these axially acting elastic means are, in accordance with a second improvement of the invention, advantageously in one piece with the plate with which the clips constituting the coupling means are in one piece.

In practice, these axially acting elastic means are then advantageously formed by the clips constituting the coupling means.

The fabrication and assembly of the clutch release bearing in accordance with the invention are further advantageously and economically simplified as a result of this.

The characteristics and advantages of the invention will emerge from the following description given by way of example with reference to the accompanying diagrammatic drawings in which:

FIGS. 12 and 13 are views respectively analogous to those of FIGS. 1 and 2 and concerning a further embodiment;

FIG. 14 is a view of it in transverse cross-section on the line XIV—XIV in FIG. 12;

FIG. 15 is a perspective view of the bearing and coupling plates that the clutch release bearing in accordance with the invention comprises in this embodiment.

Figure 2:
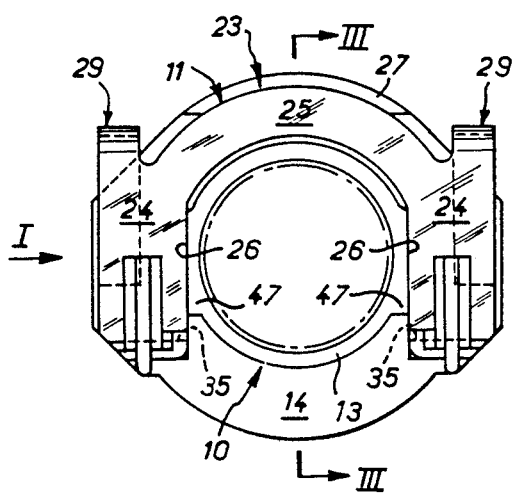
FIG. 2 is a rear view of it as seen in elevation in the direction of the arrow II in FIG. 1.
Figure 1:
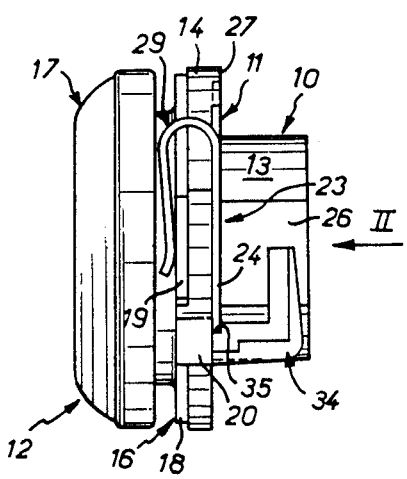
FIG. 1 is a side view of the clutch release bearing in accordance with the invention in the direction of the arrow I in FIG. 2.
Figure 3:
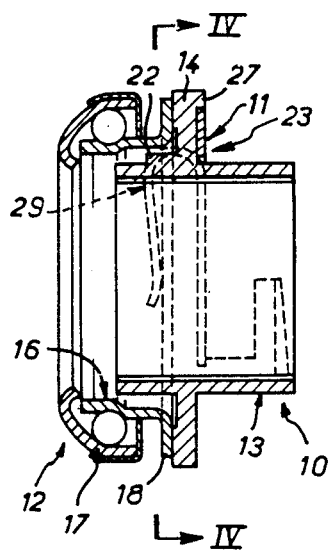
FIG. 3 is a view of it in axial cross-section on the line III—III in FIG. 2.

These figures show by way of example the application of the invention to a self-centering clutch release bearing in which the self-centering action is maintained.

Overall, the clutch release bearing comprises an operating element 10 which is adapted to be operated on by a control member, in practice a clutch release yoke 60 schematically shown in dashed outline in FIGS. 12 and 13, in practice through the intermediary of a bearing plate 11 which bears axially against it, a drive element 12 adapted to operate on the clutch release device of a clutch, also not shown, and also bearing axially on the operating element, and coupling means to be described in detail hereinafter which axially couple said drive element 12 to said operating element 10.

In the embodiments shown the operating element 10 comprises an axial sleeve 13 through which it is adapted to be slidably engaged on any form of support and guide member, not shown, for example the flared guide tube usually surrounding the input shaft of the associated gearbox, and a transverse flange 14 on which the drive element 12 bears axially.

As the operating element 10 is made of a synthetic material, the sleeve 13 and the flange 14 are in one piece.

In the embodiments shown, the drive element 12 consists of a ball bearing.

In the embodiment specifically shown in figures 1 through 6, it is a ball bearing whose inner race 16 and outer race 17 are fabricated from sheet metal.

In this embodiment it is in practice through the inner race 16 that the drive element 12 bears axially on the operating element 10, more precisely on the transverse flange 14 thereof, whereas it is through its outer race 17, which to this end is of appropriate torus-shape, that it is adapted to bear on the clutch release device of the clutch to be controlled.

For the purpose of its direct or indirect axial bearing engagement on the flange 14 of the operating element 10, which is in this instance direct with no intermediary other parts, the drive element 12 features at the corresponding end of its inner race 16 and in one piece therewith an annular radial flange 18 directed radially away from the axis of the assembly.

For reasons which will emerge later, this radial flange 18 forms two lateral arms 19 at positions that are generally diametrally opposed to each other.

The general shape of each is that of an isosceles trapezoid, the longer parallel side joining it to the radial flange 18.

Thus the overall shape of the radial flange 18 is that of an olive with the ends cut off and in practice the flange 14 of the operating element 10 has a similar contour with its curved parts slightly spaced from that of the radial flange 18.

As shown here, for immobilizing the drive element 12 against rotation the operating element 10 preferably features at least one lug 20 projecting axially from the periphery of its transverse flange 14.

In practice one such lug 20 is provided for each arm 19 of the radial flange 18 of the drive element 12, in line with the edge of the arm 19.

In practice the lug 20 extends over part only of this edge, from the straight edge forming the shorter parallel side of the arm 19 concerned and along only one of the oblique sides thereof.

As this is a self-centering clutch release bearing, the drive element 12 which is thus in contact with the flange 14 of the operating element 10 through the radial flange 18 of its inner race 16 is mounted to be movable in all transverse directions relative to the operating element 10, within predetermined limits of radial displacement, naturally.

Figure 4:
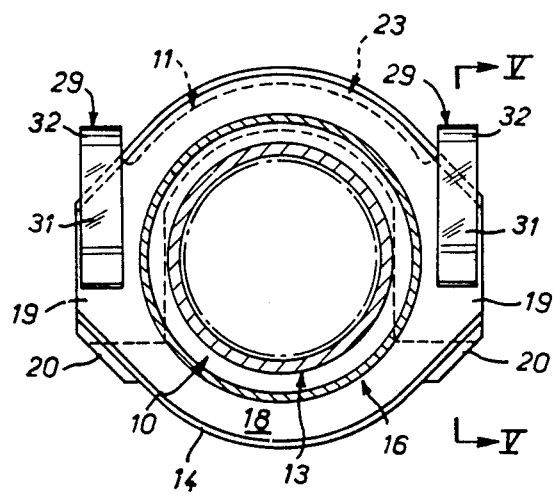
FIG. 4 is a view of it in transverse cross-section on the line IV—IV in FIG. 3.
Figure 5:
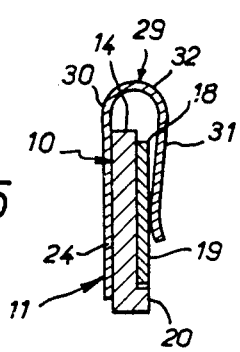
FIG. 5 is a view of it in cross-section parallel to the axis on the line V—V in FIG. 4.

This is why there is in practice some clearance between the lugs 20 of the operating element 10 and the edge of the radial flange 18 of the drive element 12 (FIGS. 4 and 5).

Likewise (FIG. 3) there is some clearance between the axial part of the inner race 16 of the drive element 12 and a boss 22 in line therewith on the operating element 10 at the point where its axial sleeve 13 merges with its transverse flange 14.

It will therefore be noted that the lugs 20 that the operating element 10 features are both on the same side of the axial plane of the assembly passing through the middle section of the arms 19 of the drive element 12.

As this is a "push" type clutch release bearing, that is to say a clutch release bearing adapted to apply a thrust to the clutch release device of the clutch to be controlled, the bearing plate 11 is on the opposite side of the flange 14 of the operating element 10 to the drive element 12.

In the embodiments shown, the bearing plate 11 in practice bears directly in the axial direction against the corresponding side of the flange 14 of the oerating element 10, without any other member being disposed between them.

It is a plate, of sheet metal, for example, which extends generally annularly around the axis of the assembly over part only of its circumference.

In accordance with the invention the coupling means that axially couple the drive element 12 to the operating element 10 are in one piece with a plate which, in the embodiments shown in FIGS. 1 through 11, is the bearing plate 11, the whole forming part of a single member 23 referred to hereinafter for simplicity only as the coupling and bearing member; as will be described in detail hereinafter, the coupling means consist of two clips 29.

Figure 6:
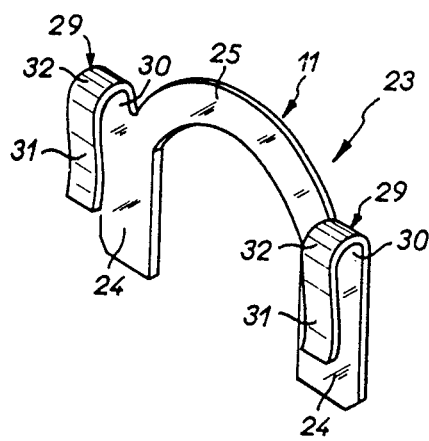
FIG. 6 is a perspective view of the coupling and bearing member used in this clutch release bearing.

The coupling and bearing member 23 is shown in isolation in FIG. 6.

The bearing plate 11 that it forms is in practice substantially plane and of generally U-shaped configuration, with two generally parallel arms 24 and a curved middle part 25 in the shape of an arch joining the arms 24 together.

In the embodiments shown the width of the main part of the arms 24 is greater than that of the curved middle part 25 and at least their respective edges facing each other are parallel to each other and respectively cooperate for purposes of angular immobilization with two radially projecting bosses 47 each with a plane facet 26 provided for this purpose, as well as for guiding the associated control member and immobilizing the clutch release bearing against rotation thereon, in generally diametrally opposite positions on the axial sleeve 13 of the operating element 10, on the same side of the flange 14 of the latter as the bearing plate 11.

In conjunction with this, for appropriate radial retention of the bearing plate 11 there is provided on the flange 14 of the operating element 10, in line with the edge of the curved middle part 25 of the bearing plate 11, an axially projecting rib 27 extending circumferentially over part of the corresponding edge of said flange 14.

As will be noted, the rib 27 that the operating element 10 thus features is disposed at a position which is generally diametrally opposite the lugs 20; this may facilitate its fabrication.

As already mentioned, in accordance with the invention the coupling means which axially couple the drive element 12 to the operating element 10 comprise two clips 29.

Disposed in practice at diametrally opposite positions relative to each other, each of the two clips 29 originates from the respective arm of the bearing plate 11.

In the embodiment specifically shown in figures 1 through 6, the two clips 29 are generally parallel to each other and each originates from the part of the arm 24 of the bearing plate 11 projecting beyond the curved middle part 25 thereof, being continuous with the thus projecting part of the arm 24.

Each of the two clips 29 is of generally U-shaped configuration with one branch 30 formed at least in part, or even virtually totally, by the arm 24 of the bearing plate 11 from which it originates, more precisely the projecting part of this arm 24; the other branch 31 forms a return which is generally parallel to the arm 24, being joined to the other branch by a curved middle part 32.

The clips 29 that the coupling and bearing member 23 thus features in accordance with the invention are hooked, that is to say radially engaged in the manner of a staple, onto the assembly consisting of the transverse flange 14 of the operating element and the radial flange 18 of the drive element 12, in line with the lateral arms 19 of the latter, as shown in the case of one of them in FIG. 5.

These clips 29 thus hold the drive element 12 axially against the operating element 10 and in this connection it should be noted that the lateral arms 19 of the drive element 12, by virtue of their size, advantageously favor the action of these clips.

As this is a self-centering clutch release bearing in which the self-centering action is maintained, the drive element 12 has also to be operated on by axially acting elastic means adapted to urge it towards the operating element 10.

According to one development of the invention, these axially acting elastic means are also in one piece with the bearing plate 11, like it and like the clips 29 constituting the aforementioned coupling means forming part of the coupling and bearing member 23.

In practice the axially acting elastic means are formed by the clips 29 themselves, the branch 31 thereof which forms a return being to this end and as shown shaped so as to be elastically deformable, in cooperation with the curved middle part 32 which joins it to the other branch 30.

To achieve proper contact with the arm 19 concerned of the radial flange 18 of the drive element 12 and in order to facilitate its engagement thereon, the end of this arm 31 of each clip 29 is generally rounded (part cylindrical), with its concave side facing away from said arm 19 and, beginning from this end, said branch 31 diverges from the other to the point where it merges continuously with the corresponding curved middle part 32.

As will be noted, extending generally parallel to the length of the arms 24 of the bearing plate 11, the branch 31 of the clips 29 is advantageously relatively long and therefore highly resilient, which provides for optimum accommodation of any manufacturing tolerances, the influence of these on the corresponding elastic force being thus minimized.

In the embodiment shown, for correct axial retention of the clutch release bearing relative to its control member, two right-angle fingers 34 are provided which, in this embodiment, are in one piece with the flange 14 of the operating element 10. Each is in line with a respective arm 24 of the bearing plate 11.

As shown here, the presence of these right-angle fingers 34 is preferably exploited by forming at their root, in the vicinity of the corresponding plane facet 26 of the sleeve 13, a pocket 35 into which the end of the corresponding arm 24 of the bearing plate 11 is inserted for improved radial retention and to contribute to its axial retention.

Because of the rib 27 on the operating element 10, the coupling and bearing plate 23 in accordance with the invention has to be fitted at a slight slant.

The necessary inclination is permitted by the elasticity of the clips 29, however.

Figure 7:
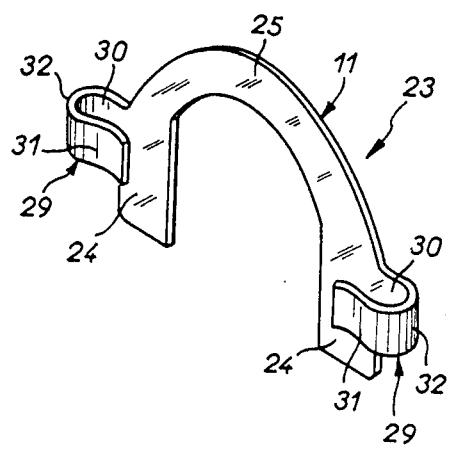
FIG. 7 is a perspective view analogous to that of FIG. 6 for an alternative embodiment of this coupling and bearing member.

In the embodiment shown in FIG. 7 the clips 29 are generally aligned with each other, being oriented in opposite directions relative to each other.

They are therefore formed on the lateral edges of the arms 24 of the bearing plate 11 facing away from each other.

Figure 8:
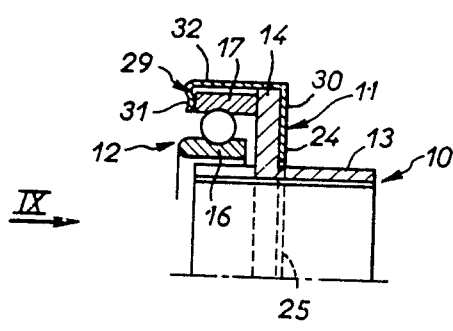
FIG. 8 is a half-view in axial cross-section on the line VIII—VIII in FIG. 9 of an alternative embodiment of the clutch release bearing in accordance with the invention.
Figure 9:
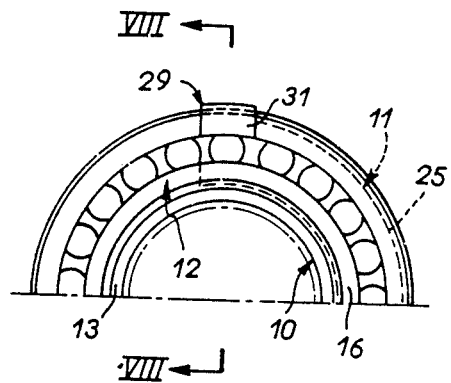
FIG. 9 is a half-view of the front of this embodiment as seen in elevation in the direction of the arrow IX in FIG. 8.

The same applies in the embodiment shown in FIGS. 8 and 9.

In this embodiment, and differing from previous arrangements, the inner race 16 and outer race 17 of the drive element 12 are castings instead of being fabricated from sheet metal and it is through its outer race 17, more precisely the corresponding edge thereof, that the drive element 12 bears axially against the transverse flange 14 of the operating element 10.

In this embodiment the branch 31 of each clip 29 bears directly on the other edge of the outer race 17.

Figure 10:
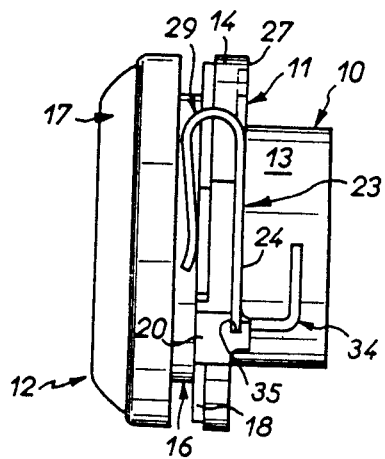
FIG. 10 is a side view analogous to that of FIG. 1 for another embodiment.
Figure 11:
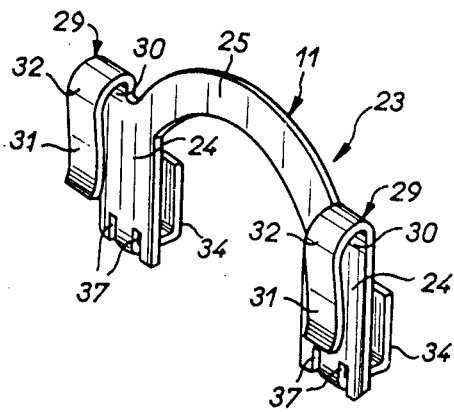
FIG. 11 is a view in perspective of the coupling and bearing member used in this embodiment.

In the embodiment shown in FIGS. 10 and 11 the right-angle fingers 34 procuring axial retention of the clutch release bearing relative to its control member are in one piece with the bearing plate 11, like it and like the clips 29 forming part of the coupling and bearing member 23.

They are formed by bending to U-shape an extension of each arm 24 of the bearing plate 11, this extension being bracketed at its root by two slots 37 separating it from the remainder of the end of the arm 24 from which it is formed in this way.

If required, the edges of the arms 24 of the bearing plate 11 which face each other may each be bordered by a right-angle lip in one piece therewith for guiding the associated control member and immobilizing the clutch release bearing from rotating thereon.

In all cases and as previously pockets 35 may be provided on the operating element 10 for the ends of the arms 24 of the bearing plate 11 to be inserted in, said pockets 35 being formed, for example, by hooks in one piece with the transverse flange 14 of the operating element 10 and bracketing the right-angle fingers 34 formed by the bearing plate 11.

In what has been described so far, the plate 11 with which the clips 29 forming the coupling means which axially couple the drive element 12 to the operating element 10 are in one piece itself forms the bearing plate.

In the embodiments shown in FIGS. 12 through 15, in which the same elements are designated by the same reference numbers, two separate plates are provided.

Firstly, there is a bearing plate 11 as previously and this bearing plate 11 bears directly in the axial direction against the corresponding side of the flange 14 of the operating element 10 with no other part disposed between them.

In practice it is a metal plate, more precisely a plate of relatively thick sheet metal.

E is the thickness of this bearing plate 11.

In the embodiment shown this bearing plate 11 comprises a circumferentially continuous annular washer 44 around the axis of the assembly by which it is adapted to be engaged over the sleeve 13 of the operating element 10 and, in diametrally opposed positions relative to each other, two arms 46 in one piece with the washer 44 and extending generally radially relative thereto, for the fingers 45 of the clutch release yoke constituting the control member 60 to bear on.

For cooperation with the bosses 47 each having a plane facet 26 projecting radially from the sleeve 13 of the operating element 10 on the same side of the flange 14 as the bearing plate 11 there are provided, in corresponding relationship on the inside contour of the washer 44 of the bearing plate 11, two complementary notches 49 by means of which the washer 44 is adapted to be interlocked with the bosses 47.

The arms 46 of the bearing plate 11, which generally exend along the same diameter as those 19 of the drive element 13 and thus those complementarily formed by the flange 14 of the operating element 10, projecting radially cantilever-fashion considerably beyond the latter, each terminate in the embodiment shown with a right-angle upstand 50 adapted to guide the corresponding finger 45 of the clutch release yoke constituting the control member 60 and to immobilize the clutch release bearing assembly against rotation relative to the latter.

For axial retention of the clutch release bearing relative to the clutch release yoke constituting the control member 60, the right-angle upstand 50 on one of the arms 46 of the bearing plate 11 features along at least part of its edge, parallel to the arm 46 concerned and in the direction towards the axis of the assembly, a lug 51 by means of which the clutch release bearing as a whole is adapted to be hooked over the corresponding finger 45 of said clutch release yoke.

The coupling means which axially couple the drive element 13 to the operating element 10 form part of a member 53 separate to the bearing plate 11, referred to hereinafter for convenience only as the coupling member.

In accordance with the invention the coupling member 53 comprises a transverse plate 54, hereinafter referred to for convenience only as the coupling plate, through which it bears axially and either directly or indirectly on the bearing plate 11; said coupling plate 54 extends generally circumferentially around the axis of the assembly over part of the circumference only.

In the embodiment shown the coupling plate 54, which is substantially plane, is of generally U-shaped configuration and bears directly in the axial direction against the bearing plate 11, more precisely against the annular washer 44 that the latter comprises, being directly superposed on the washer 44.

The coupling plate 54 thus comprises two lateral arms 55 at generally opposed positions and an arch-shaped rounded curved middle part 56 joining the arms 55 together.

In the embodiment shown, the arms 55 of the coupling plate 54 are substantially parallel to each other.

They are also substantially perpendicular to the arms 46 of the bearing plate 11, from which they are spaced.

In practice they extend radially over part only of the bearing plate 11 corresponding to the washer 44 thereof and therefore provide free access to the arms 46 of the bearing plate 11 for the fingers 45 of the clutch release yoke constituting the control member 60.

To immobilize it, and therefore all of the coupling member 53 of which it forms part, against rotation the coupling plate 54 bears radially against the bosses 47 on the operating element 10, through its inside edge.

In the embodiment shown, the coupling plate 54 thus bears in practice on the bosses 47 on the operating element 12 through the inside edges of its arms 55, and to this end each edge is straight over part at least of its length, where it contacts the plane facet 26 of said bosses 47.

Thus in the embodiment shown the same bosses 47 on the operating element 10 serve to immobilize against rotation both the bearing plate 11 and the coupling plate 54, and thus the coupling member 53 of which the latter forms part.

For appropriate radial retention of the bearing plate 11 and the coupling plate 54, and thus of the coupling member 53 of which the latter forms part, there is provided on the flange 14 of the operating element 10, in line with the edge of the curved middle part 56 of the coupling plate 54, an axially projecting rib 57 extending circumferentially along part of the corresponding edge of said flange 14.

As will be noted, in the embodiment shown the rib 57 that the operating element 10 thus features is at a position diametrally opposed to the lugs 20, extending over a circular sector smaller than that separating the lugs; this may facilitate its fabrication.

As previously, the coupling means which couple the drive element 13 axially to the operating element 10 comprise two clips 59 which are disposed at positions diametrally opposite each other and each of which is formed from the coupling plate 54, in line with the arms 55 thereof.

In practice, each of the clips 59 has a generally U-shaped configuration with one branch 61 formed at least in part, if not virtually totally, by the corresponding arm 55 of the coupling plate 54, the other branch 62 forming a return generally parallel to the arm 55, merging with the other branch through a curved middle part 63.

The two branches 61 and 62 that each clip 59 thus features are in practice offset relative to each other not only axially, by virtue of the U-shape that they form, but also radially, the branch 62 forming a return for the corresponding arm 55 of the coupling plate 54 being generally farther from the axis of the assembly than the branch 61 formed at least in part by the arm 55.

In other words, the part of the branch 61 of a clip 59 by which it originates from the curved middle part 56 of the coupling plate 54, at the root of the corresponding arm 55 of the coupling plate 54, extends generally obliquely relative to its main part, formed by said arm 55.

On the other hand, the associated branch 62 extends parallel to the arm 55; in the embodiment shown its free end is set back relative to that of the branch 61 formed in this instance by that of the arm 55 in question of the coupling plate 54.

As shown here, in a preferred arrangement involving also the aforementioned coupling and bearing member 23, the free end of the branch 62 diverges obliquely, bevel fashion, from the coupling plate 54 to form with the corresponding arm 55 thereof, and thus the associated branch 61, an outwardly flared engagement throat.

Finally, taken overall, the two clips 59 are generally parallel to each other in the embodiment shown.

The thus constituted coupling member 53 may be of metal, for example.

It may equally well be made of a synthetic material, however.

Be this as it may, it will be noted that its thickness e and notably that of the coupling plate 54 that is comprises is advantageously much less than that E of the bearing plate 11.

Moreover, in the embodiment shown in FIGS. 13 through 15, the operating element 10 features, at the point where its axial sleeve 13 merges with its transverse flange 14, a number of bosses 22 appropriately distributed in the circumferential direction.

At assembly time, following application of the bearing plate 11 against the transverse flange 14 of the operating element 10, the clips 59 of the coupling member 53 are engaged radially over the assembly comprising the bearing plate 11, the transverse flange 14 and the flange 18 of the drive element 12, in line with the lateral arms 19 of the latter.

In practice, such engagement is begun at a slight slant to get past the rib 57 on the operating member 10.

As is readily understood the clips 59 of the coupling member 53 have some inherent elasticity in the axial direction.

As previously, they are therefore advantageously able to constitute directly and of themselves the axially acting elastic means adapted to be operative axially between the operating element 10 and the drive element 12 for retaining the latter in position relative to the operating element 10 after it is centered thereon.

The present invention is naturally not limited to the embodiments described and shown, but encompasses any variant execution and/or combination of the various component parts thereof.

In particular, when a separate coupling plate is used it need not necessarily bear directly on the associated bearing plate in the axial direction; on the contrary, it may do so indirectly, it being equally feasible for any form of washer to be disposed between the two plates, for example.

The same applies to the axial bearing engagement of the drive element on the operating element.

There is claimed:

1. A self-centering clutch release bearing in particular for automobile vehicles, said clutch release bearing comprising an operating element cooperable with a control member, a drive element cooperable with a clutch release device of a clutch and effectively bearing axially on said operating element, and coupling means coupling said drive element axially to said operating element for permitting transverse shifting movement of said drive element relative to said operating element to effect self-centering, said coupling means being of a one piece construction and including a substantially plane plate of an overall U-shaped configuration with two arms disposed generally parallel to each other and joined together by a curved middle part in the shape of an arch, and two clips disposed at generally diametrically opposite positions relative to each other and each emanating from a respective one of said arms of said plate with said coupling means being transversely moved into clipping position.

2. A clutch release bearing according to claim 1, wherein said clips form axially acting elastic means for resiliently urging said drive element and said operating element axially towards each other.

3. A clutch release bearing according to claim 1, wherein said operating element is cooperable with said control member through said substantially plane plate which defines a bearing plate.

4. A clutch release bearing according to claim 3, wherein each of said clips is of a generally U-shaped configuration having two branches, one of said branches being formed at least in part by the respective one of said arms of said plate, the other of said branches forming a return generally parallel to said one branch.

5. A clutch release bearing according to claim 3, wherein said clips are generally parallel to each other.

6. A clutch release bearing according to claim 3, wherein said clips are generally aligned with each other, said clips being oriented in opposite directions relative to each other.

7. A clutch release bearing according to claim 1, wherein axially acting elastic means urges said drive element towards said operating element, said axially acting elastic means being of a one-piece construction with said substantially plane plate.

8. A clutch release bearing according to claim 7, wherein said axially acting elastic means are defined by said clips.

9. A clutch release bearing according to claim 8, wherein each of said clips is of a generally U-shaped configuration having two branches, one of said branches being formed at least in part by a respective one of said arms of said substantially plane plate and the other of said branches forming a return disposed generally parallel to said one branch, said other branch being elastically deformable.

10. A clutch release bearing according to claim 9, wherein said elastically deformable branch has an end portion which is generally curved and having a concave side facing away from the respective one of said arms of said substantially plane plate.

11. A clutch release bearing according to claim 1, wherein said drive element features two lateral arms at positions that are generally diametrically opposed to each other for cooperation with respective ones of said clips.

12. A clutch release bearing according to claim 11, wherein said drive element bears axially against said operating element through an annular radial flange provided on said drive element, said lateral arms each forming a respective radial extension of said flange.

13. A clutch release bearing according to claim 12, wherein each of said lateral arms has a generally isosceles trapezoid-shaped contour including a major base, and said major base joins each of said lateral arms to the respective radial extension.

14. A clutch release bearing according to claim 11, wherein said operating element has at least one axially projecting lug in line with an edge of one of said lateral arms for cooperation therewith.

15. A clutch release bearing according to claim 1, wherein right-angle fingers are provided for axial retention of the clutch release bearing relative to the control member, and said right-angle fingers are of a one-piece construction with said substantially plane plate.

16. A clutch release bearing according to claim 1, wherein the edges of the arms of said plane plate facing each other are each bordered by a right-angle lip of a one-piece construction with said substantially plane plate.

17. A clutch release bearing according to claim 1, wherein said operating element is cooperable with said control member through a bearing plate, and said substantially plane plate defining a coupling plate separate from said bearing plate.

18. A clutch release bearing according to claim 17, wherein said coupling plate bears axially against said bearing plate.

19. A clutch release bearing according to claim 18, wherein said coupling plate directly overlies said bearing plate.

20. A clutch release bearing according to claim 17, wherein said bearing plate includes two arms at diametrically opposite positions relative to each other and cooperable with respective fingers of said control member, said arms of said coupling plate extending substantially perpendicularly to said arms of said bearing plate and at a distance therefrom.

21. A clutch release bearing according to claim 17, wherein said operating element includes at least one radially projecting boss for immobilizing said bearing plate against rotation, and said coupling plate being in radial immobilizing relationship against said boss through an inside edge thereof.

22. A clutch release bearing according to claim 21, wherein two of said bosses are provided, each of said bosses having a plane facet and being in diametrically opposed positions relative to each other on said operating element, and an inner edge of each of said arms of said coupling plate being straight over that part of its length where it contacts said plane facet of one of said bosses.

23. A clutch release bearing according to claim 17, wherein each of said clips has a generally U-shaped configuration with two branches, one of said branches being formed at least in part by one of the arms of said coupling plate, and the other of said branches forming a return disposed generally parallel to said one branch.

24. A clutch release bearing according to claim 23, wherein the two branches of one said clip are offset axially and radially relative to each other, said branch forming said return for a corresponding arm of said coupling plate being generally farther from the axis of the bearing than that branch formed at least in part by the arm.

25. A clutch release bearing according to claim 23, wherein said two clips forming said coupling means are generally parallel to each other.

* * * * *